United States Patent
Ohkawa

(10) Patent No.: US 7,703,936 B2
(45) Date of Patent: Apr. 27, 2010

(54) ILLUMINATION DEVICE, LIGHT GUIDE PLATE, SURFACE LIGHT SOURCE DEVICE AND ILLUMINATION UNIT

(75) Inventor: Shingo Ohkawa, Misato (JP)

(73) Assignee: Enplas Corporation, Saitama (JP)

( * ) Notice: Subject to any disclaimer, the term of this patent is extended or adjusted under 35 U.S.C. 154(b) by 3 days.

(21) Appl. No.: 11/489,453

(22) Filed: Jul. 20, 2006

(65) Prior Publication Data
US 2007/0041171 A1 Feb. 22, 2007

(30) Foreign Application Priority Data
Jul. 20, 2005 (JP) .............................. 2005-210157

(51) Int. Cl.
*G09F 13/04* (2006.01)
(52) U.S. Cl. ....................... 362/97.1; 362/224; 362/330
(58) Field of Classification Search ................. 362/330, 362/97, 29, 30, 632–634; 349/61–64, 65
See application file for complete search history.

(56) References Cited

U.S. PATENT DOCUMENTS

| | | | | |
|---|---|---|---|---|
| 4,974,122 A | * | 11/1990 | Shaw | 362/615 |
| 4,998,804 A | * | 3/1991 | Horiuchi | 349/64 |
| 5,046,826 A | * | 9/1991 | Iwamoto et al. | 349/65 |
| 5,986,728 A | * | 11/1999 | Bernard | 349/68 |
| 6,330,111 B1 | * | 12/2001 | Myers | 359/599 |
| 6,561,663 B2 | * | 5/2003 | Adachi et al. | 362/616 |
| 6,568,822 B2 | | 5/2003 | Boyd et al. | |
| 6,874,900 B2 | * | 4/2005 | Hsieh | 362/26 |
| 6,906,461 B2 | * | 6/2005 | Yamamoto et al. | 313/594 |
| 7,063,448 B2 | * | 6/2006 | Kang et al. | 362/558 |
| 7,125,141 B2 | * | 10/2006 | Pao et al. | 362/225 |
| 7,142,768 B2 | * | 11/2006 | Tseng | 385/146 |
| 2007/0183137 A1 | * | 8/2007 | Iwasaki | 362/97 |

FOREIGN PATENT DOCUMENTS

JP 2003-279978 10/2003

* cited by examiner

*Primary Examiner*—Gunyoung T Lee
(74) *Attorney, Agent, or Firm*—Staas & Halsey LLP

(57) ABSTRACT

An illumination device, surface light source device, and an illumination unit are provided that provide increased and uniform emission brightness. The device includes parallel fluorescent lamps between a reflection sheet and light flux control member. A back face of the light flux control member includes recesses and curved surfaces connected to locations corresponding to those of the fluorescent lamps. Each recess and curved surface includes light entering surfaces. An entering surface causes light coming to areas corresponding to the fluorescent lamps, included in the light reaching a light diffusing member, to diverge smoothly. Another light entering surface and convex curved surface causes light coming to areas, which do not correspond to the fluorescent lamps, adjacent to areas corresponding to the fluorescent lamps to have light intensity increased to that of the light coming to the areas corresponding to the fluorescent lamps.

5 Claims, 15 Drawing Sheets

ILLUMINATION DEVICE, LIGHT GUIDE PLATE, SURFACE LIGHT SOURCE DEVICE AND ILLUMINATION UNIT

CROSS-REFERENCE TO RELATED APPLICATIONS

This application is related to and claims priority to Japanese Patent Application No. 2005-210157, filed on Jul. 20, 2005, and incorporated herein by reference.

BACKGROUND

1. Field

The embodiments discussed herein are directed to an illumination device, a surface light source device and an illumination unit. An illumination device or a surface light source device in accordance with the present invention is applied to backlighting of LCD panel. An illumination unit comprises said devices and a member-to-be-illuminated such as LCD panel. The present invention is applicable to illumination devices and surface light source devices for backlighting in TV-monitor displays or personal computer's monitor displays. The present invention is also applicable to uses such as interior indication illumination or various illuminators.

2. Description of the Related Art

Surface light source devices or illumination devices employing a plurality of fluorescent lamps (linear light sources) have been conventionally used as illumination means for LCD monitors used in personal computers, television sets or the like. In general, a device of such kind is composed of a plate-like diffusion member, a reflection member and a plurality of fluorescent lamps (linear primary light sources) disposed between the diffusion member and the reflection member. The diffusion member and the reflection member has generally the same shape and size as those of a LCD panel of the LCD monitor.

Light of the fluorescent lamps is inputted to a light inputting face (i.e. a face directed to the reflection member) of the diffusion member directly or after being reflected by the reflection member, being diffused and then outputted from a light outputting face (i.e. a face opposite to the light inputting face).

Diffusion effected by the diffusion member causes the light outputting face to show brightness uniform to a certain extent. However, areas just above the respective fluorescent lamps and vicinage thereof (called primary-light-source-corresponding-area) are different in brightness from the other area (called primary-light-source-non-corresponding-area). In other words, the primary-light-source-non-corresponding-area gives a reduced brightness as compared with the primary-light-source-corresponding-area.

Document 1 (JP 2003-279978 A) provides a solution for overcoming such a problem. FIG. 17 illustrates the solution. Referring to FIG., light source device 100 comprises fluorescent lamps 101 diffusion member 102.

Thickness of diffusion member 102 is large at just above fluorescent lamp 101, 210 (namely, in the primary-light-source-corresponding-area) and small between fluorescent lamps 101, 101 adjacent to each other (namely, in the primary-light-source-non-corresponding-area).

This causes light outputted from the primary-light-source-corresponding-area to be more attenuated by absorption as compared with light outputted from the primary-light-source-non-corresponding-area. As a result, brightness increasing in primary-light-source-corresponding-area is suppressed, leading to a uniform brightness.

However, obtaining a uniform brightness tends to bring a much reduced light utilization efficiency because the art relies on partial absorption of light traveling toward the primary-light-source-corresponding-area. Doubtlessly, this is not desirable.

SUMMARY

It is an aspect of the embodiments discussed herein to provide an illumination device and a surface light source device which are improved as to be able to output a uniform illumination light with a less reduction in light utilization efficiency. Another aspect of the present invention is to provided an illumination unit employing the improved illumination device or surface light source device.

First, the present invention is applied to an illumination device comprising a reflection member, a light flux control member disposed along and separated from said reflection member and a plurality of linear primary light sources disposed between said reflection member and said light flux control member parallel with each other at intervals.

The present invention is also applied to a surface light source device comprising a reflection member, a light flux control member disposed along and separated from said reflection member, a plurality of linear primary light sources disposed between said reflection member and said light flux control member parallel with each other at intervals and a plate-like light diffusion member.

According to a feature of the present invention, said light flux control member has a back face directed to said reflection member in order to receive light from said primary light sources and an emission face directed oppositely to said back face in order to cause said light received to be transmitted, deflected and emitted.

In addition, at least one of said back face and said emission face is provided with a plurality of recesses and curved surfaces, each of said recesses having a location correspond to that of one of said primary light sources and extending in a longitudinal direction of said one of said primary light source, and said curved surfaces being located adjacent to said recesses and configured as to cause said light flux control member to decrease in thickness away from said recesses, respectively.

Then said back face provides a configuration bulging as to increase the flux control member in thickness, at and around boundary between each recess and each curved surface adjacent thereto.

In a case where the present invention is applied to a surface light source device, said light diffusion member is disposed along said emission face in order to diffuses light emitted from said emission face.

Further, an illumination unit comprising in accordance with the present invention is provided by combine the above illumination device or surface light source device and a member-to-be-illuminated irradiated by an illumination light outputted from the illumination device or surface light source device.

According to the present invention, much of light from linear light sources is bent (deflected) either any recess of a light flux control member or any curved surface adjacent thereto (connected thereto). Light bent by a recess has traveling directions diverged more smoothly as compared with an imaginary case of flat surface (no recess).

Light bent by a curved surface has traveling directions in a rather narrower range as compared with an imaginary case of flat surface (no recess). Light containing both such diverged light and narrowed light has a two-dimensionally uniform intensity. In addition, utilization of intensity is hardly reduced because obtaining a uniform brightness of intensity does not rely upon partial attenuation of light.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 2b is a side view of the surface light source device shown in FIG. 2a;

FIG. 4 is a cross section view along A-A in FIG. 1a;

FIG. 12b is a cross section view along A1-A1 in FIG. 12a;

DETAILED DESCRIPTION OF THE EMBODIMENTS

Figure 1A:
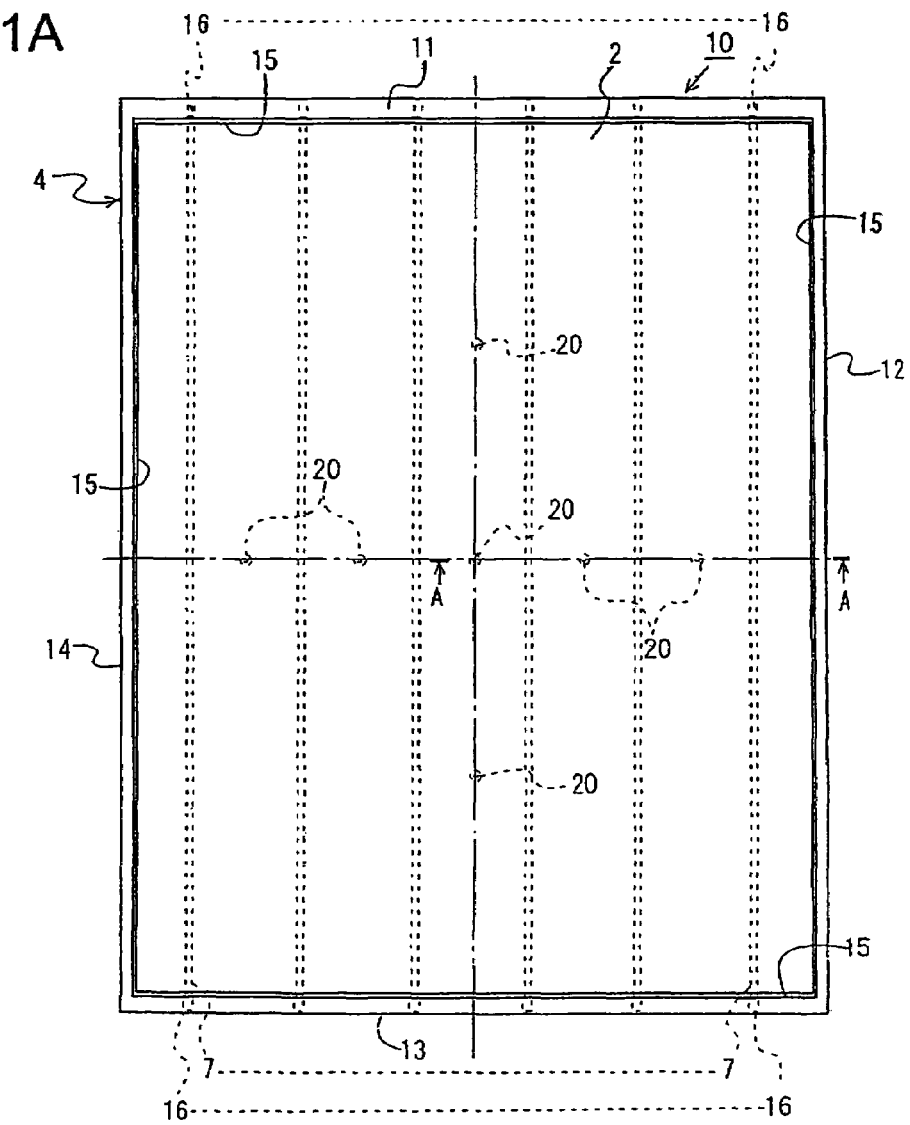
FIG. 1a is a plan view of a surface light source device of a first embodiment in accordance with the present invention.
Figure 1B:
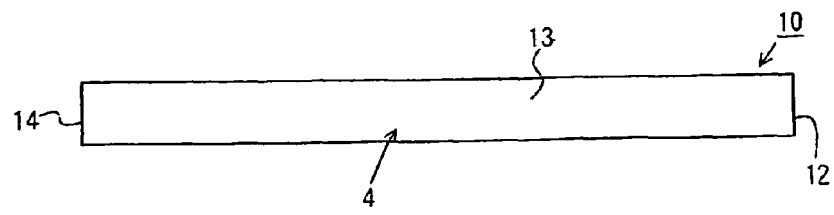
FIG. 1b is a side view of the same surface light source device.

FIGS. 1a, 1b to FIG. 4 illustrate surface light source device 10 of a the embodiment, FIG. 1a being a plan view of surface light source device 10, FIG. 1b being a side view of surface light source device 10. FIGS. 2a and 2b illumination device 1 included in surface light source device 10. It is noted that illustration of FIG. 2a is done, with diffusing member (member-to-be-illuminated) 2 irradiated by illumination light from surface light source device 10 being removed.

Figure 2A:
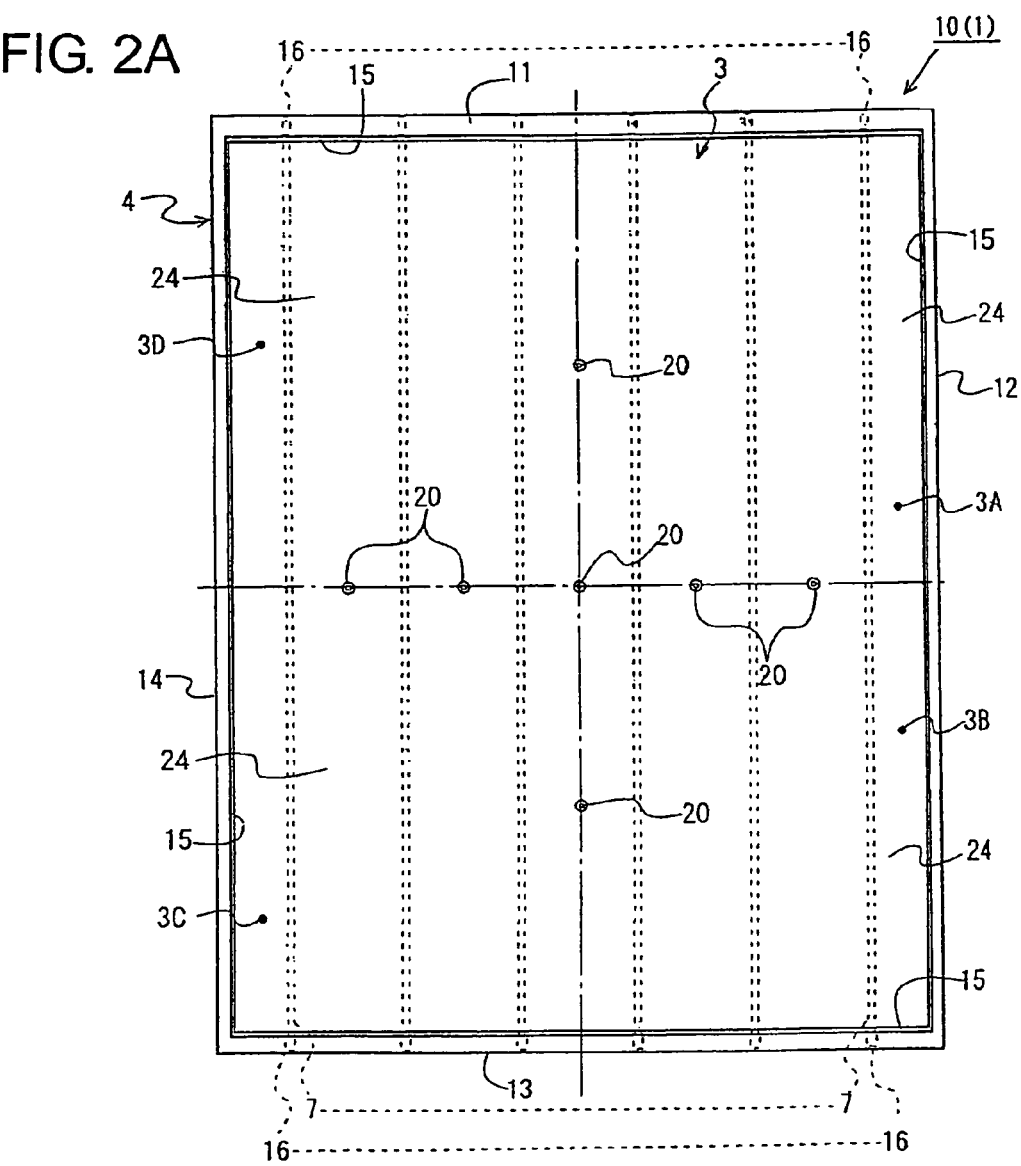
FIG. 2a is a plan view of the surface light source device shown in FIG. 1a wherein a diffusing member is removed.
Figure 2B:
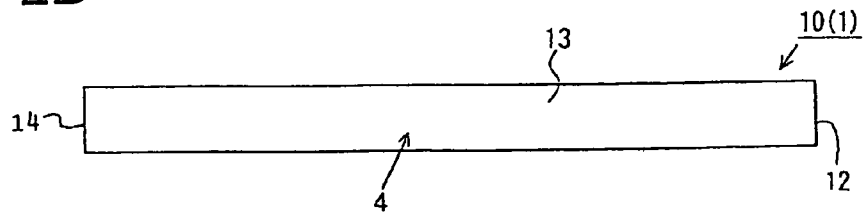
Figure 3:
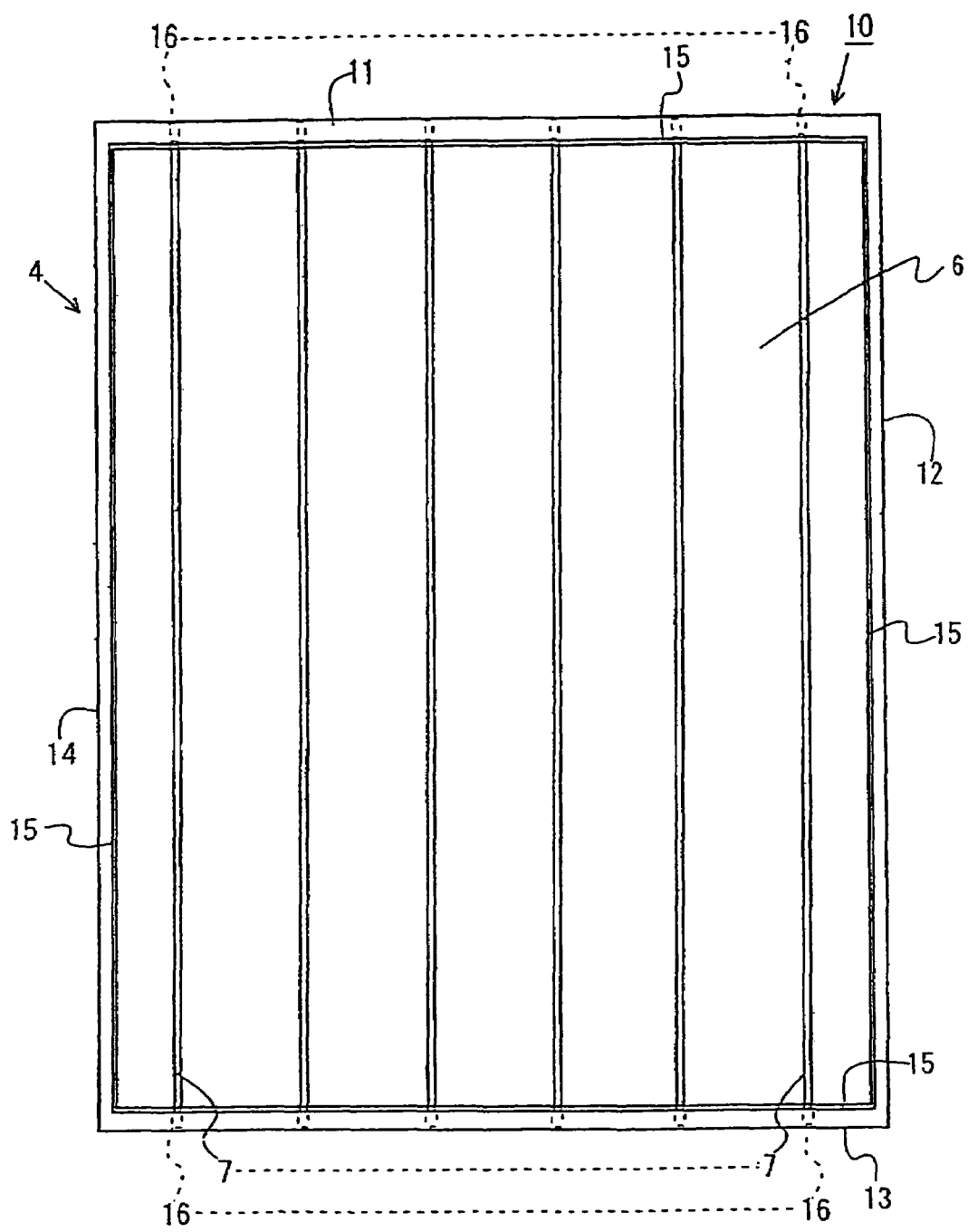
FIG. 3 is a plan view of the surface light source device shown in FIG. 1a wherein the diffusing member and a light flux control member are removed.
Figure 4:
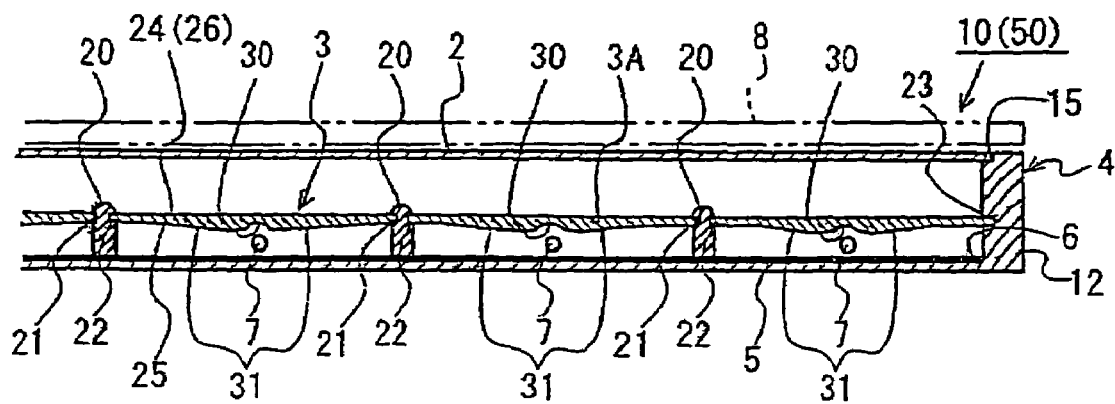
Figure 5A:
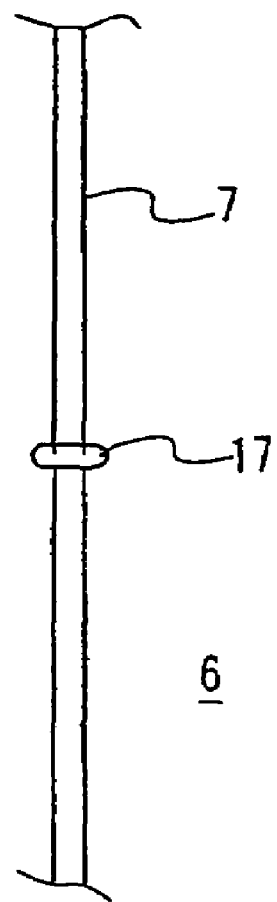
FIG. 5a is a diagram illustrating a supporting structure of a longitudinally intermediate portion of a fluorescent lamp.
Figure 5B:
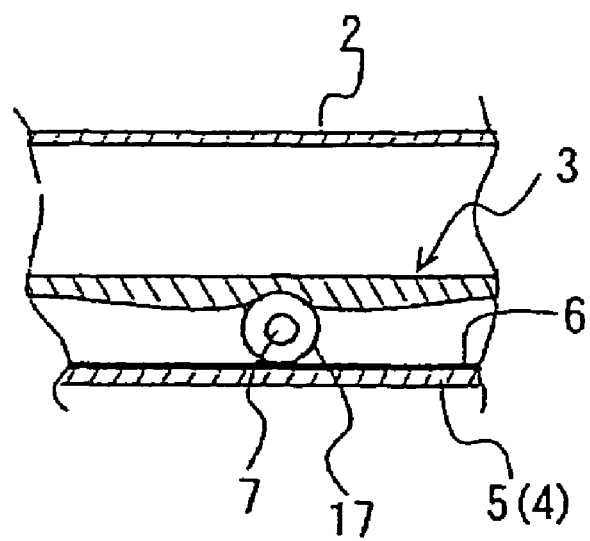
FIG. 5b is a cross section view of the supporting structure along a plane perpendicular to a longitudinal direction of the fluorescent lamp.

FIG. 2b is a side view of illumination device 1 shown in FIG. 2a. FIG. 3 is a plan view of surface light source device 10 wherein diffusing member 2 and light flux control member 3 are removed from surface light source device 10. FIG. 4 is a cross section view of surface light source device 10 along A-A in FIG. 1a.

As illustrated in the figures, surface light source device 10 includes illumination device 1 (See FIG. 2) provided with frame 4 on bottom 5 of which reflection sheet (reflection member) 6 is disposed, a plurality of fluorescent lamps (linear primary light sources) 7 disposed parallel with each other at certain intervals on reflection sheet 6 and light flux control member 3 disposed above fluorescent lamps 7.

This illumination device 1 and plate-like diffusing member 2 compose surface light source device 10. Diffusing member 2 is disposed as to put a cover on an upper opening end of frame 4.

If a member-to-be-illuminated (e.g. LED panel) 8 is arranged further on diffusing member 2, illumination unit 50 is provided. If LED panel) 8 is arranged, illumination unit 50 provides a liquid crystal display (LCD; See FIG. 4).

Light of fluorescent lamps 7 is inputted into light flux control member 3 directly or after being reflected by reflection sheet 6, transmitting light flux control member 3 and being supplied to member-to-be-illuminated 8 via diffusing member 2.

Frame 4 is composed of rectangular bottom board 5 and four side walls 11, 12, 13, 14 rising from edges of bottom board 5, providing a shape like a box having an upward opening. Frame 4 may be made of a resin material such as PC (polycarbonate) or PMMA (polymethyl methacrylate). Cut portion 15 is formed along an opening edge of the upper opening end as to be engage with four side ends of diffusing member 2.

Side walls 11, 13 opposite to each other of short sides of Frame 4 are provided with holes 16, respectively, which are located as to correspond to locations of fluorescent lamps 7 for accommodating and securing end portions of fluorescent lamps 7.

As shown in FIGS. 3 and 4, reflection sheet 6 is a film-like member having shape and size generally the same those of bottom board 5, being made a white resin material (such as PC, PET (polyethylene terephthalate)). Reflection sheet 6 has a reflection surface which is directed to light flux control member 3 and has a diffusive-reflection function.

As shown in FIGS. 1a, 1b to 5, both end portions of each fluorescent lamp 7 are accommodated in and secured by holes of side walls 11, 13 of frame 4, respectively, and each fluorescent lamp 7 is secured on reflection sheet 6 by rubber ring(s) 17 fit to the fluorescent lamp at one or a plurality of parts between both end portions of the fluorescent lamp. Reflection sheet 6 is arranged across a gap of a certain size.

As shown in FIG. 2a, light flux control member 3 is composed of four light flux control member chips 3A to 3D each of which has a rectangular plan shape. Light flux control member chips 3A to 3D are thin plates made of transparent resin material such as PMMA (polymethyl methacrylate) or PC (polycarbonate), or transparent glass.

As shown in FIGS. 2a to 4, light flux control member chips 3A to 3D have abutting faces against the other of light flux control member chips 3A to 3D adjacent thereto, respectively, wherein the abutting faces are provided with a plurality of cuts 22 into which axes of spacers 20 are fit when engagement into engaging grooves 21 of spacers 20 is done, respectively.

Edge ends of light flux control member chips 3A to 3D are opposite to side walls 11 to 14 of frame 4, being fit into engaging grooves 23 formed on frame 4, respectively (See FIG. 4). Light flux control member chips 3A to 3D are secured as to be kept separated from reflection sheet 6 at a certain distance by being fit into engaging grooves 21 and 23, respectively.

It is noted that spacers 20 are column-like rods as shown in FIGS. 4 and 2, having tops (upper tops) configured as to be fit easily into cuts 22 of light flux control member chips 3A to 3D, respectively.

Engaging grooves 21 are formed at locations distant from lower ends of spacers 20 by a certain distance. Spacers are preferably made of a material such as rubber. The reason of this is that elastic transformation will be able to absorb size errors when assembling of surface light source device 10 is carried out.

In addition, light flux control member chip 3A has a face (i.e. upper face=light emitting face) which extends parallel with reflection sheet 6 under situation that light flux control member chip 3A is held by engaging grooves 21, 23 of spacer 20 and side walls 11 to 14, as shown in FIG. 4.

On the other hand, a back face of light flux control member chip 3A to 3D (i.e. lower face=light entering face) 25 is arranged oppositely to any fluorescent lamp 7 and has recess 30 and curved surface 31 adjacent to (connected to) recess 30, which run in a longitudinal direction of fluorescent lamp 7. Light flux control member chips 3B to 3D are also provided with recesses and curved surfaces formed generally in the same way.

Figure 6:
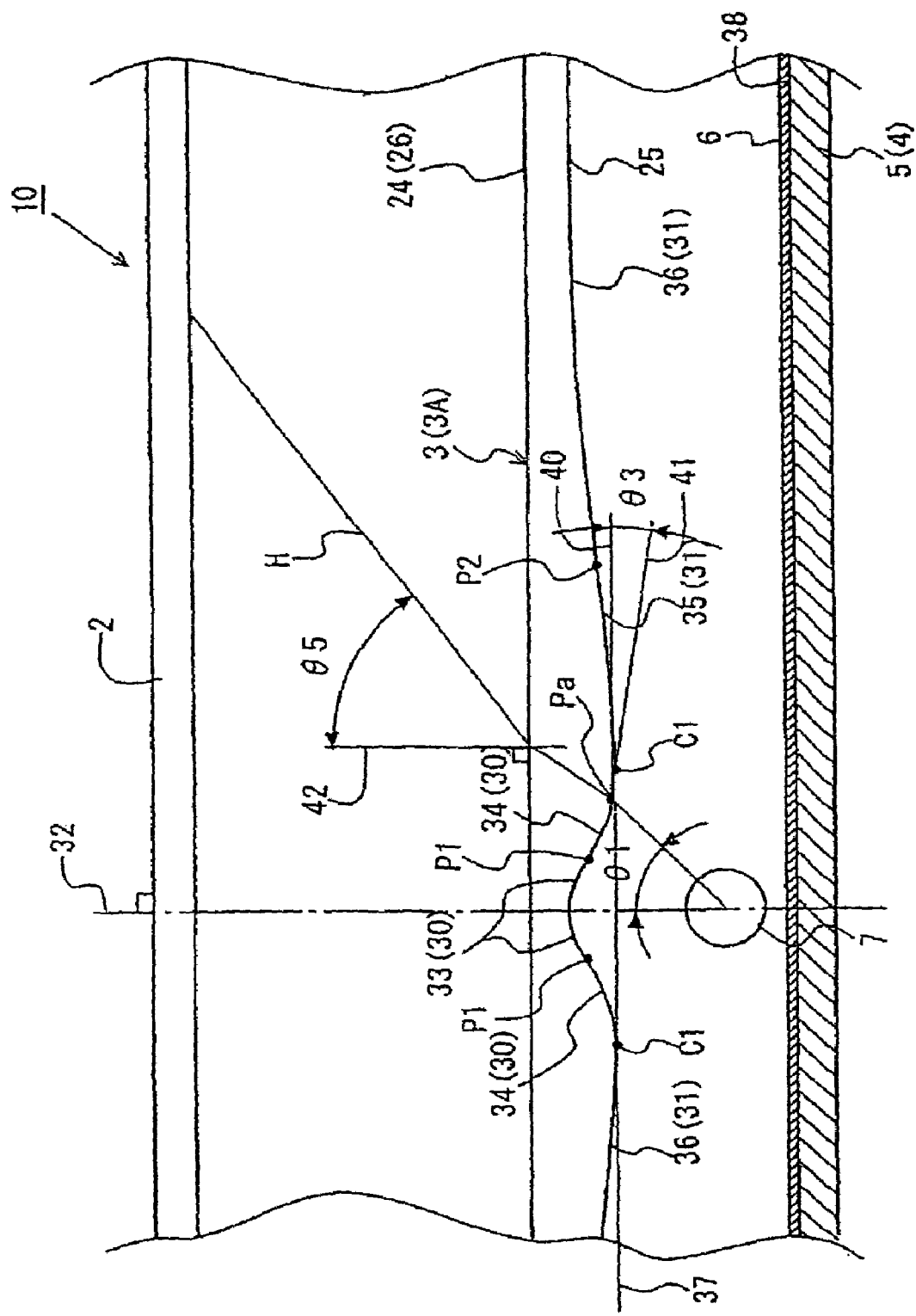
FIG. 6 is a partially enlarged cross section view of the vicinity of the fluorescent lamp shown in FIG. 4 for illustrating a recess and curved surface configuration following the recess formed on a light flux control member used in the surface light source device of the first embodiment.

FIG. 6 is a partially enlarged cross section view of surface light source device 10, giving a partially enlarged illustration of FIG. 4. In FIG. 6, light flux control member chip 3A is shown exemplarily as a part of light flux control member 3. Referring to this exemplary illustration of light flux control member chip 3A, configurations of recess 30 and curved surface 31 are described. A line extending from a tube diameter center of fluorescent lamp 7 as to be vertical to front face 24 (emission reference plane 26) of light flux control member chip 3A is called "normal" 32.

In a cross sectional plane perpendicular to a longitudinal direction of fluorescent lamp 7, recess 30 gives first light entering surface 33 like an arc a center of which is located on normal 32 and a second light entering surface 34, 34 smoothly connected to first light entering surface 33. First light entering surface 33 provides a concave surface which recesses away from fluorescent lamp 7 and is configured symmetrically with respect to normal 32.

In addition, a pair of second light entering surfaces 34, 34 give convex surface which is curved generally inversely as compared with first light entering surface 33 and is configured symmetrically with respect to normal 32.

As a result, a connection portion between first light entering surface 33 and second light entering surface 34, 34 gives inflection P1. Curved surface 31 is connected smoothly to second light entering surface 34 of recess 30, providing a slope gently curved as to get remote from reflection sheet 6 (as to reduce thickness of light flux control member 3) as a whole.

Seeing curved surface 31 in details, curved surface 31 includes third light entering surface 35 and fourth light entering surface 36. Third light entering surface 35 is a curved surface convex toward the same direction as compared with second light entering surface 34 of recess 30 and fourth light entering surface 36 is a curved surface convex toward an inverse direction as compared with second light entering surface 34.

This causes a connection portion C1 between second light entering surface 34 and third light entering surface 35 to give a connection portion (boundary) between recess 30 and curved surface 31. In addition, a connection portion between third light entering surface 35 and fourth light entering surface 36 gives inflection P2.

After all, thickness of light flux control member chip 3A (light flux control member 3) increases gradually away from a center of recess 30 (i.e. a crossing point where a surface of recess 30 meets normal 32) to connection portion (boundary between recess 30 and curved surface 31) C1, then decreasing gently.

In other words, the back light flux control member chip 3A (light flux control member 3) provides a surface configuration bulging as to increase thickness of the light flux control member at and around boundary C1 between each recess 30 and curved surface 31 adjacent thereto.

It is noted that light flux control member chip 3A gives a back face side tangent line 37 which extends parallel with front face 24 of light flux control member chip 3A and come in contact with light flux control member chip 3A at boundary C1 between second light entering surface 34 and third light entering surface 35.

In FIG. 6, reference plane 38 is a horizontal plane perpendicular to normal 32 extending from the tube diameter center of fluorescent lamp 7, and Pa is a position at which light H emitted from fluorescent lamp 7 is incident to light flux control member chip 3A (i.e. a position at which light H meets second light entering surface 34 of recess 30 in a cross section shown by FIG. 6), and line 40 extends parallel with reference plane 38 as to pass position Pa.

Further in FIG. 6, angle θ3 is defined as an angle made by line 40 and tangent line 41 of second light entering surface 34 of recess 30 at position Pa where light H emitted from fluorescent lamp 7 is incident to light flux control member chip 3A. Light H gives an emission angle θ5 on being on being emitted from surface 2 of light flux control member chip 3A after entering into light flux control member chip 3A.

In other words, emission angle θ5 is an angle made by light H emitted from emission reference plane 26 and normal 42 with respect to front face 24. Reference plane 38, back face side tangent line 37 and emission reference plane 26 are parallel with each other.

Angle θ3 gives an angle with respect to a light entering surface of light flux control member chip 3A in generally the same way at positions other than second light entering surface 34, giving an angle made by a tangent line of first light entering surface 33 and back face side tangent line 37, giving also an angle made by a tangent line of third light entering surface 35 and back face side tangent line 37, and further an angle made by a tangent line of fourth light entering surface 36 and back face side tangent line 37.

Figure 8:
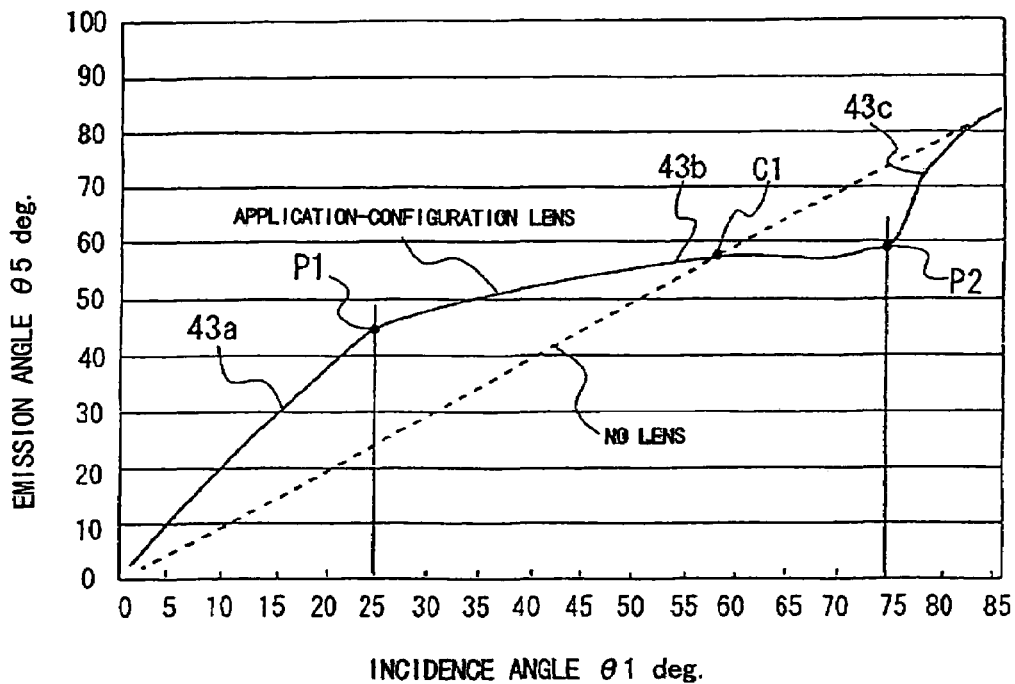
FIG. 8 is a diagram for illustrating a relation between light incidence angle θ1 and emission angle θ5 of the light flux control member employed in the first embodiment.

Recess 30 has a configuration such that first light entering surface 33 corresponds a curved surface in which light H gives an angle within a certain range ($0<\theta1\leq25°$) with respect to normal 32 and relation between $\theta5$ and $\theta1$ satisfies, except for light very near to normal 32, a condition that $(\theta5/\theta1)>1$ and value of $\theta5/\theta1$ decreases gradually with increase of $\theta1$ (See curve 43 in FIG. 8).

It is noted that the above "very near" to normal 32 corresponds preferably to a range of $\theta1$ roughly from $-5°$ to $+5°$. In addition, relation between $\theta3$ and $\theta1$ at first light entering surface 33 of recess 33 is such that $\theta3$ increases gradually with increase of $\theta1$ in a range $0<\theta1\leq25°$ as shown by curve 44a in FIG. 9, giving the maximum of $\theta3$ when $\theta1=25°$.

Figure 9:
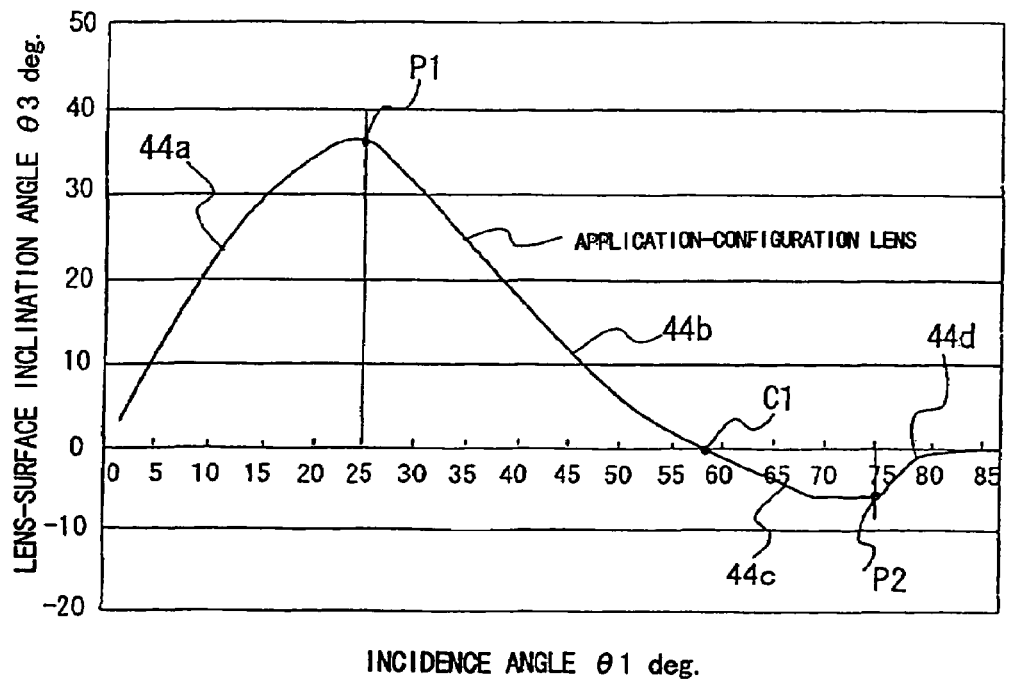
FIG. 9 is a diagram for illustrating a relation between light incidence angle θ1 and lens surface inclination angle θ3 of the light flux control member employed in the first embodiment.

In FIGS. 8 and 9, APPLICATION-CONFIGURATION LENS means light flux control member 3 of the embodiment provided with recesses 30 and curved surfaces 31, and NO LENS means a plan-plate-like light flux control member provided with neither recess 30 nor curved surface 31 or an arrangement in which no light flux control member is disposed between fluorescent lamps 7 and diffusing member 2.

Figure 7:
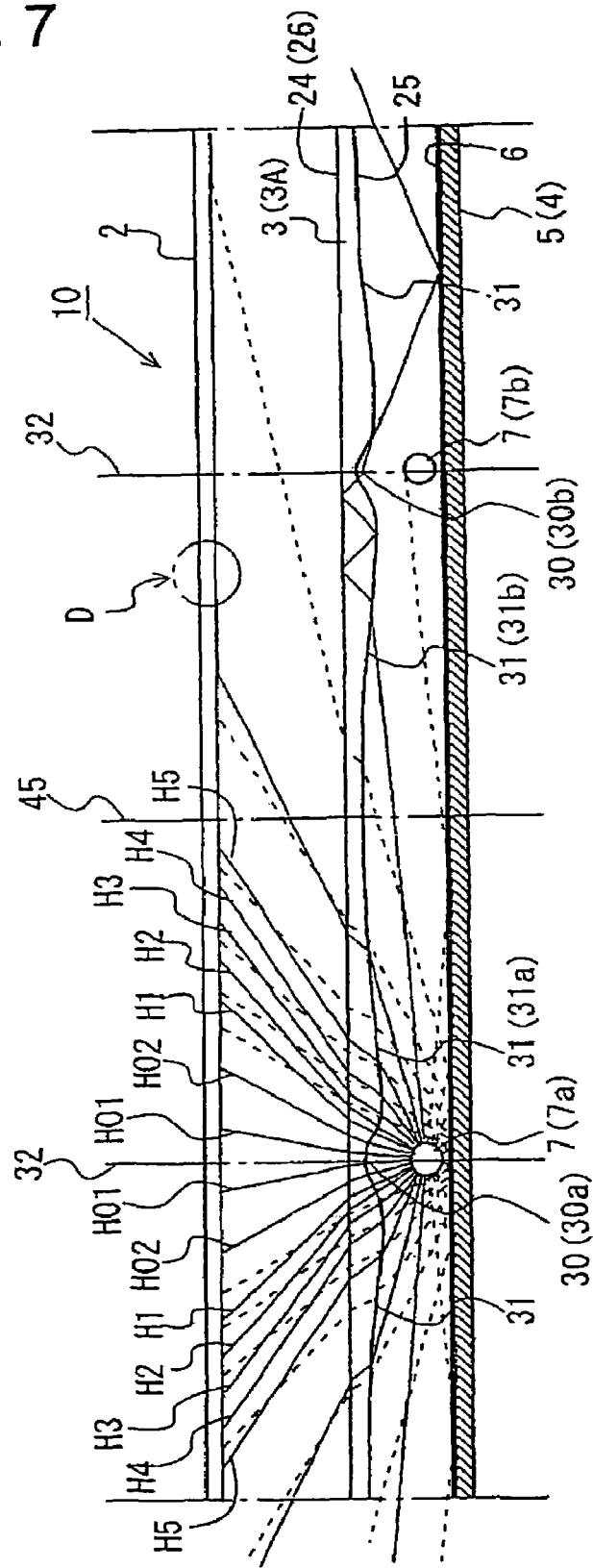
FIG. 7 is a cross section view of the surface light source device for illustrating effects (emission characteristics) of the light flux control member employed in the first embodiment.

Although recess 30 shown in FIG. 6 satisfies $\theta5/\theta1>1$ in a range a connection portion (i.e. point of inflection P1) between first light entering surface 33 and second light entering surface 34 to connection portion C1 between second light entering surface 34 and third light entering surface 35, rate of change of $\theta5$ with respect to that of $\theta1$ is small (See curve 43b in FIG. 8), and light H1, light H2 and light H3 emitted from front face 24 of light flux control member chip 3A are roughly parallel with each other (See FIG. 7).

This recess 30 gives $\theta3$ decreases gradually with increase of $\theta1$ in a range between point of inflection P1 and connection portion C1 (See curve 44b in FIG. 9).

In addition, curved surface 31 following recess 30 shown in FIG. 6 gives $\theta5$ that has a small rate of change with respect to that of $\theta1$ in a range of third light entering surface 35 (i.e. connection portion C1 meeting recess 30 to point of inflection P2) in the generally the same way (See curve 43b in FIG. 8), and light H4 and light H5 emitted from front face 24 of light flux control member chip 3A are roughly parallel with light H1, light H2 and light H3.

Further, if ±sign of gradient of tangent line at any point of second light entering surface 34 of recess 30 is defined plus, third light entering surface 35 is configured so that $\theta3$ has a minus gradient in contrast with second light entering surface 34 in a range (from connection portion C1 to point of inflection P2) of third light entering surface 35 (See curve 44c in FIG. 9).

In the next place, curved surface 31 shown in FIG. 6 is configured so that $\theta5$ increases with increase of $\theta1$ as to make $\theta5/\theta1$ close to 1 gradually (See curve 43c in FIG. 8) in a rage of fourth light entering surface 36 (i.e. in a range from connection portion (point of inflection P2) between third light entering surface 35 and fourth light entering surface 36 to an intermediate position 45 between two fluorescent lamps 7, 7 adjacent to each other (See FIG. 7)). In addition, $\theta3$ increases with increase of $\theta1$ as to get closer to 0 gradually (See curve 44d in FIG. 9) in the rage of fourth light entering surface 36.

In the next place, described are operations of first and second light entering surfaces 33, 34 providing recesses 30 of light flux control member chips 3A to 3D, respectively, and effects of third and fourth light entering surfaces 35, 36 providing curved surfaces 31 following the recesses, respectively.

As shown in FIG. 7, almost all of the light from fluorescent lamps 7 enters into light flux control member chip 3A through recesses 30 and curved surfaces 31 adjacent thereto directly or after being reflected by reflection sheet 6. On this entering, light introduced into light flux control member chip 3A through first light entering surface 33 has emission angle $\theta5$ greater than $\theta1$, being emitted from front face (emission face) 24 as to provide an expanded light flux (See light H01, light H02 in FIG. 7).

On the other hand, light incident to second light entering surface 34 of recess 30 or third light entering surface 35 of curved surface 31 gives angle $\theta5$ of emission from light flux control member chip 3A as to change only slightly depending on change of $\theta1$. Accordingly, a roughly parallel flux is emitted from front face 24 (See light H1 through H5 in FIG. 7).

As a result, light emitted from light flux control member chip 3A and supplied to diffusing member 2 has a weakened light intensity (irradiation density) in the vicinity of location(s) just above fluorescent lamp(s) 7 (i.e. primary-light-source-corresponding-area) as compared with a case where no light flux control member chip 3A (light flux control member 3) is interposed between fluorescent lamps 7 and diffusing member 2 (See light H01, H02 in FIG. 7).

To the contrary, an intensified irradiation density is realized in regions between fluorescent lamps 7 adjacent to each other (i.e. in a primary-light-source-non-corresponding-area; See light H1 through H5 in FIG. 7).

It is noted that curved surfaces 31 are configured so that light irradiating diffusing member 2 after going beyond intermediate position 45 between fluorescent lamps 7, 7 adjacent to each other has a weakened irradiation density (i.e. reduced light intensity) as compared that of light which provides irradiation in a range from normal 32 to intermediate position 45. In addition, emission light supplied by one fluorescent lamp 7 via light flux control member 3 and light supplied by another fluorescent lamp 7 adjacent and near thereto are mixed partially, providing an illumination light without unnatural feeling (without unevenness in brightness).

Therefore the embodiment overcomes a problem that arises when light flux control member 3 is not disposed and light of fluorescent lamps 7 is supplied directly to diffusing member 2 (i.e. problem that primary-light-source-non-corresponding-area is less bright while primary-light-source-corresponding-area is bright). As a result, a uniform brightness distribution of light supplied to diffusing member 2 is obtained, and according thereto, emission brightness of light emitted from diffusing member 2 is also uniform (See FIG. 10).

Figure 10:
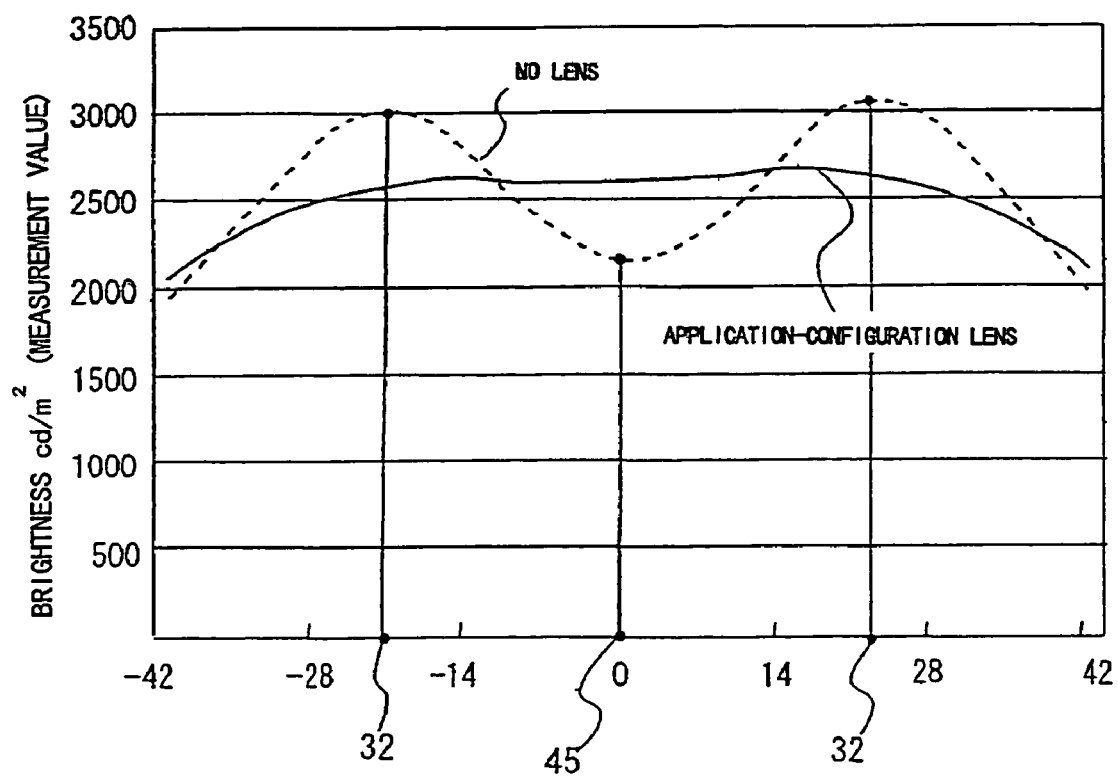
FIG. 10 is a diagram for illustrating intensity values of emission from surface light source devices (diffusing members) in accordance with the first embodiment and a prior art, respectively, in contrast with each other.

In FIG. 10, APPLICATION-CONFIGURATION means emission brightness curve of surface light source device 10 provided with light flux control member 3 of the embodiment provided with recesses 30 and curved surfaces 31. NO LENS means emission brightness curve of a surface light source device provided with no light flux control member 3 between fluorescent lamps 7 and diffusing member 2.

After all, recesses 30 of light flux control member 3 function as to give expanded light traveling directions to the light which is emitted from fluorescent lamps 7 and directed to vicinage of locations just above fluorescent lamps 7 (i.e. primary-light-source-corresponding-area), thereby preventing the primary-light-source-corresponding-area from providing an excessively high brightness.

On the other hand, curved surface 31 following recess 30 functions as to check expansion of the light which is emitted from fluorescent lamp 7 (7a in FIG. 7) and reaches curved surface 31 (curved surface 31b in FIG. 7) following recess 31 corresponding to adjacent fluorescent lamp 7 (fluorescent lamp 7b in FIG. 7) and recess 30 (recess 30b in FIG. 7), thereby preventing a region between fluorescent lamps 7a and 7b (primary-light-source-non-corresponding-area) from providing a short of illumination light.

In addition, according to the embodiment, traveling directions of light from fluorescent lamps 7 and light after being reflected by reflection sheet 6 are changed by light flux control member 3 and a uniform brightness distribution of light supplied to diffusing member 2 is obtained, with the result that loss of light is reduced as compared with the foresaid prior art (Document 1) which is subject to a large light absorption in a primary-light-source-corresponding-area.

It is noted that this embodiment allows modifications as described below.

The example shown FIG. 2 employs light flux control member 3 composed of four light flux control member chips 3A to 3D. However, it is allowed to employ light flux control member 3 composed of two, three or not less than five light flux control member chips. Alternatively, light flux control member 3 may be formed of a single body.

Configuration of recess 30 and curved surface 31 following the same (For example, angles θ1, θ3, θ5 at positions of inflection point P1, connection portion C1 and inflection point P2) may depend on pitch size of fluorescent lamps 7, 7 adjacent to each other or distance between light flux control member 3 and fluorescent lamps 7. Further, recess 30 and curved surface 31 may be partially formed of a plane.

Diffusion members shown in FIGS. 1 and 4 are sheet-like or plate-like members made of light well-permeable resin such as PMMA or PC, being plane-shaped like rectangles. Each diffusion member causes light emitted from light flux control member 3 to be diffused during transmitting, thereby causing a member-to-be-illuminated to be irradiated by uniform light. FIGS. 11a to 11f show examples of such diffusion members.

Figure 11A:
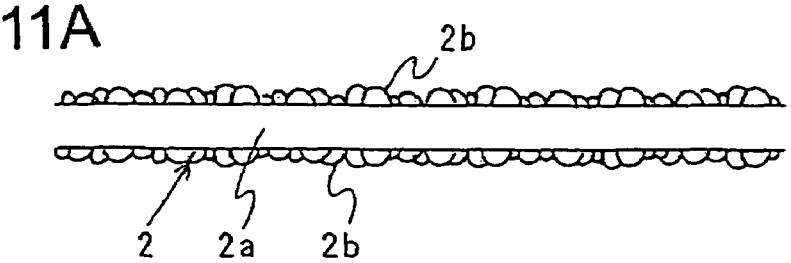
FIG. 11a are partially (part D shown in FIG. 7) enlarged illustrations of diffusing members, FIG. 11a being a side view of a light diffusing member of a first example, FIG. 11b being a side view of a light diffusing member of a second example, FIG. 11c being a side view of a light diffusing member of a third example, FIG. 11d being a side view of a light diffusing member of a fourth example, FIG. 11e being a side view of a light diffusing member of a fifth example and FIG. 11f being a side view of a light diffusing member of a sixth example.

Diffusion member 2 shown in FIG. 11a employs sheet-like base material 2a to both faces of which processing for giving light diffusion ability, such as emboss-processing or bead-processing, is applied, being provided with fine uneven configurations 2b, 2b.

Figure 11B:
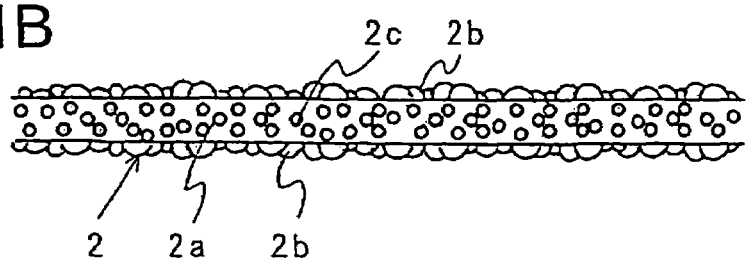

Diffusion member 2 shown in FIG. 11b employs sheet-like base material 2a to both faces of which processing for giving light diffusion ability, such as emboss-processing or bead-processing, is applied to form fine uneven configurations 2b, 2b while light diffusive material 2c is dispersed within base material 2a.

Figure 11C:
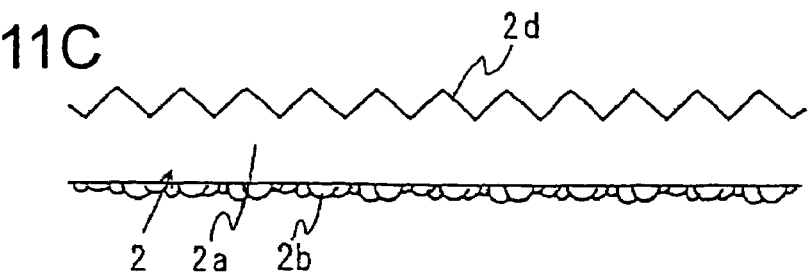

Diffusion member 2 shown in FIG. 11C employs sheet-like base material 2a having a face which is directed to light flux control member 3 and provided with fine uneven configuration 2b formed by application of processing for giving light diffusion ability, such as emboss-processing or bead-processing. The other face opposite to this face is provided with a great number of successive prismatic projections 2d extending along a direction perpendicular to the paper surface.

Figure 11D:
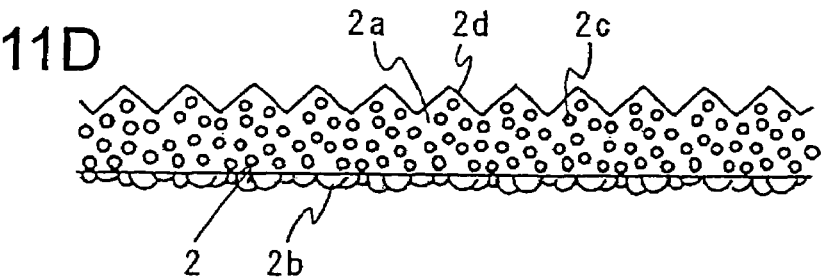

Diffusion member 2 shown in FIG. 11d is the same as one shown in FIG. 11c except that light diffusive material 2c is dispersed within base material 2a. In the same manner as the case of FIG. 11c, processing such as emboss-processing or bead-processing is applied to a face directed to light flux control member 3 to form a fine uneven configuration 2b. The other face is provided with a great number of successive prismatic projections 2d.

Each of prismatic projections 2d shown in FIGS. 11c and 11d is shaped, for instance, like isosceles triangle.

Figure 11E:
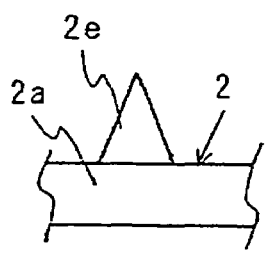

Diffusion member 2 shown in FIG. 11e employs sheet-like base material 2a on an emission side face of which a plurality of circular-cone-like projections 2e are formed. Circular-cone-like projections 2e have a function of diffusing light transmitting through sheet-like base material 2a.

Figure 11F:
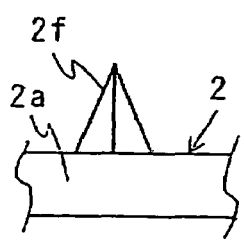

Diffusion member 2 shown in FIG. 11f employs sheet-like base material 2a on an emission side face of which pyramid-like (such as triangle-pyramid-like, quadrangle-pyramid-like or hexangle-pyramid-like) projections 2f. Such projections 2f have a function of diffusing light transmitting through sheet-like base material 2a.

It is noted that such diffusion members 2 as described above may be mounted on a face, on the side of fluorescent lamps 7, of member-to-be-illuminated 8, or alternatively, may be disposed dependently (separately) from member-to-be-illuminated 8 on the side of fluorescent lamps 7.

It is also noted that degree of brightness uniformity on a back face (irradiated face) of diffusion member (illuminated member) 2 changes little depending on distance L4 (See FIG. 1) between light flux control member 3 and diffusion member 2.

However, emission brightness of diffusion member 2 shows change depending on diffusing ability of diffusion member 2. For example, if diffusion member 2 having a low diffusing ability is disposed close to light flux control member 3, diffusion is performed insufficiently and an uneven brightness distribution tends to appear.

If diffusion member 2 having the same diffusing ability as that of the above diffusion member is disposed distant from light flux control member 3, a uniform brightness distribution is obtained because of diffusion performed by an air layer given between light flux control member 3 and diffusion member 2. Therefore surface light source device 10 providing an even brightness distribution can be made thin-structured by giving the optimum combination of diffusing ability diffusion member 2 and distance L4 between light flux control member 3 and diffusion member 2.

As described already, the embodiment the light which emitted from light flux control member 3 and supplied to diffusion member 2 has a reduced intensity in primary-light-source-corresponding-area (See H01, H02 in FIG. 7) and has an increased intensity in primary-light-source-non-corresponding-area (See H1 to H5 in FIG. 7) as compared with a case (prior art) in which no light flux control member 3 is disposed between fluorescent lamps 7 and diffusion member 2.

Accordingly, provided is a suppressed unbalance in light intensity (See FIG. 10) between primary-light-source-corresponding-area (vicinage of areas just above fluorescent lamps 7) and primary-light-source-non-corresponding-area (intermediate areas between fluorescent lamps 7 adjacent to each other).

It is noted that a dotted brightness curve shown in FIG. 10 was obtained by measuring brightness of emission from diffusion member 2 depending on position under a condition such that no light flux control member 3 is disposed between fluorescent lamps 7 and diffusion member 2 in surface light source device 10.

As shown in FIG. 10, the dotted brightness curve gives the highest brightness at positions just above fluorescent lamps 7 (at the positions corresponding to normals 32 in FIG. 7) and gives the lowest brightness at an intermediate position between fluorescent lamps 7a and 7b (at the position corresponding to line 45 parallel with normals 32 in FIG. 7).

To the contrary, a solid brightness curve for APPLICATION-CONFIGURATION LENS was obtained by measuring brightness of emission from diffusion member 2 depending on position for surface light source device 10.

The solid brightness curve gives the same brightness at positions just above fluorescent lamps 7 (at the positions corresponding to normals 32 in FIG. 7) as that given at an intermediate position between fluorescent lamps 7a and 7b (at the position corresponding to line 45 parallel with normals 32 in FIG. 7).

In addition, according to the embodiment, traveling directions of light from fluorescent lamps 7 and light reflected by reflection sheet 6 are changed by light flux control member 3 so that diffusion member 2 is irradiated by light having a uniform brightness distribution, providing an increased light utilization efficiency as compared with that obtained in the prior art relying upon light absorption.

Illumination unit 50 in accordance with the embodiment can cause member-to-be-illuminated 8 to be illuminated by bright and uniform illumination light as described above, providing an improved illumination quality as compared with that obtained in the prior art.

Figure 12A:
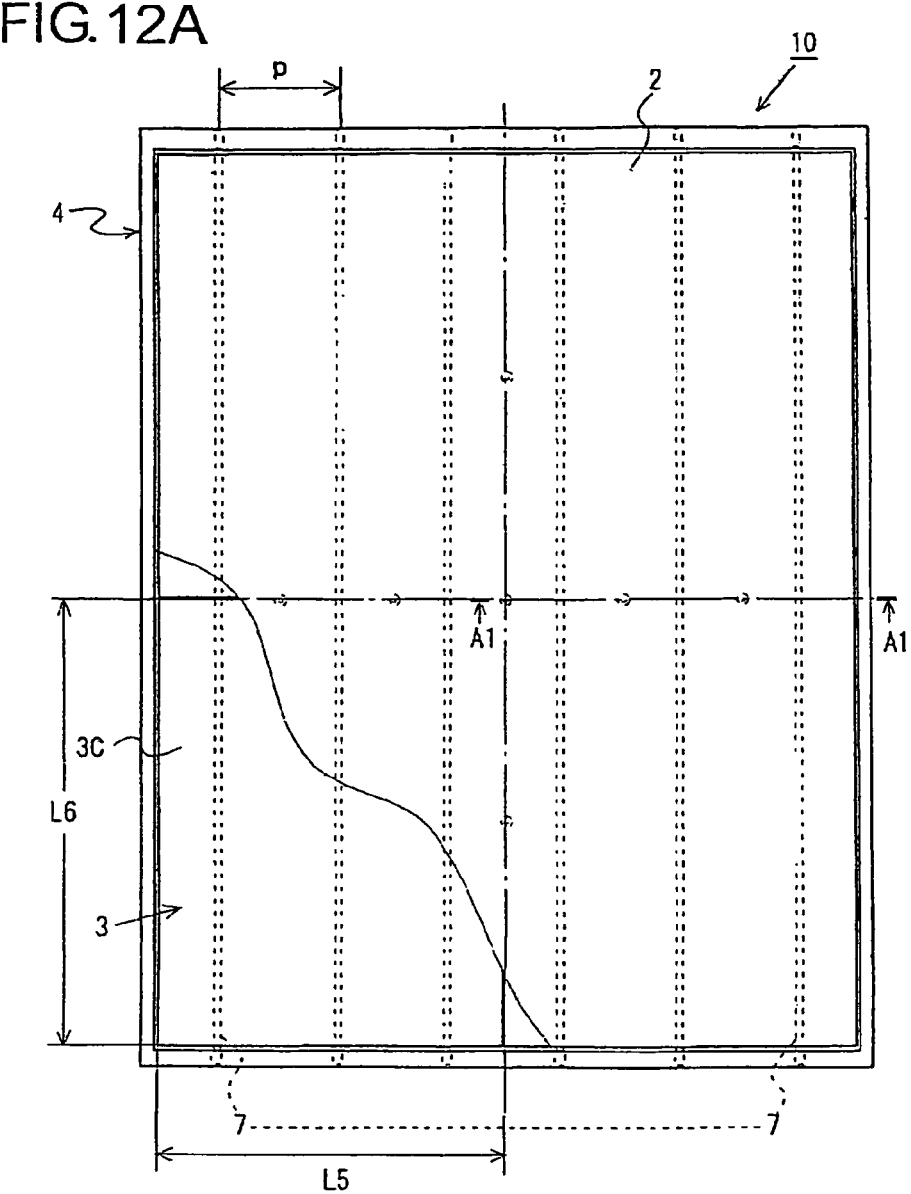
FIG. 12a is a plan view of a surface light source device wherein a diffusing member employable in the first embodiment is partially cut off for the sake of illustration.
Figure 12B:
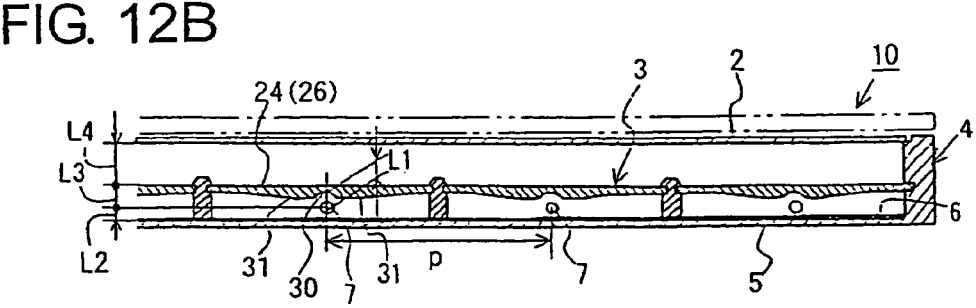

In the next place, a concrete example of size and configuration of the respective parts such as recess 30 and curved surface 31 following the same of light flux control member 3 is described by referring to FIG. 12.

Size and configuration of recess 30 and curved surface 31 are determined generally depending on pitch size p1 between fluorescent lamps 7, 7 adjacent to each other, distance L3 from front face (emission face) 24 of light flux control member 3 to a center of fluorescent lamp 7 and distance L1 from the center of fluorescent lamp 7 to the deepest portion of recess 7. A concrete example of values is as follows. It is provided that light flux control member 3 is made of transparent resin having refractive index n equal to 1.49. It is noted that L2 is distance from fluorescent lamp 7 to a reflective surface of reflection sheet 6 and L4 is distance from front face (emission face) 24 of light flux control member 3 to diffusion member 2. In addition, L5 and L6 are sizes in length and breadth, respectively:

p=45 mm;
L1=4 mm;
L2=1.5 mm;
L3=5 mm;
L4=11 mm;
L5=135 mm;
L6=178 mm.

It is noted that a curve showing $\theta1$-$\theta5$-relation in FIG. 8 and a curve showing $\theta1$-$\theta3$-relation in FIG. 9 are plotted based on measurement values obtained in a case of surface light source device 10 employing the above example of values in accordance with the embodiment.

Figure 13:
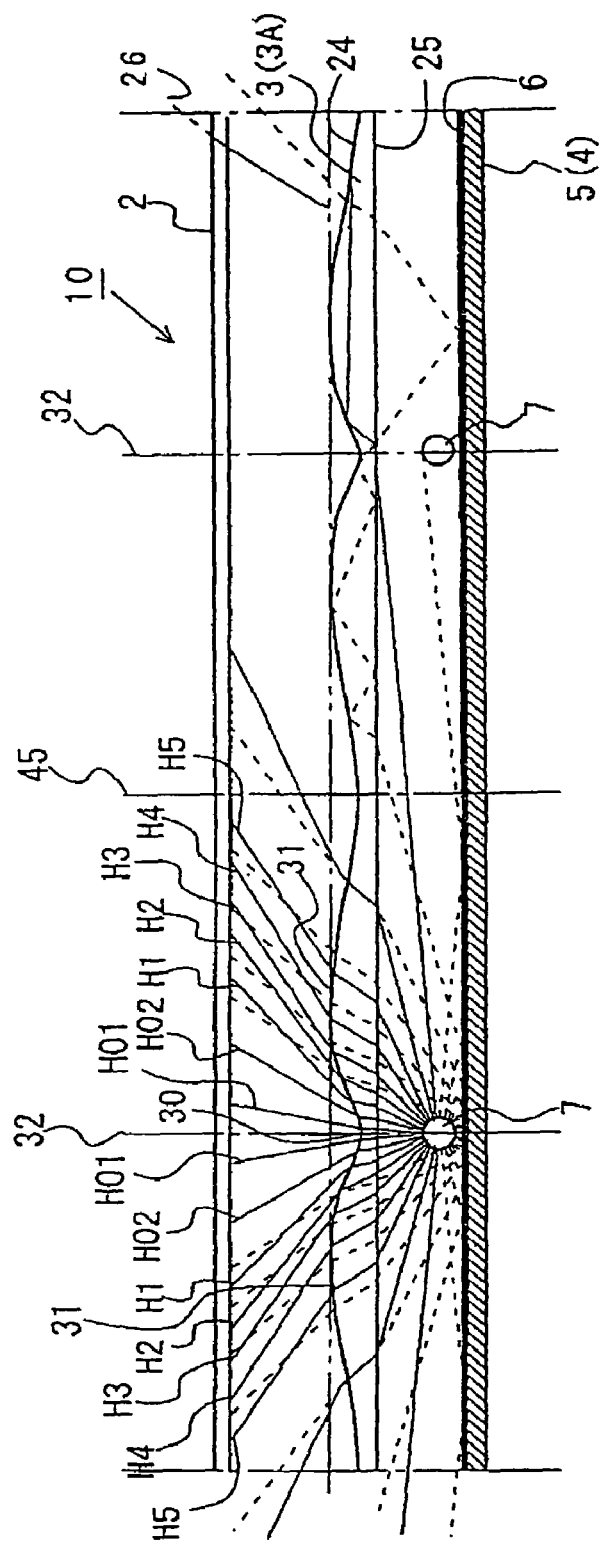
FIG. 13 is a cross section view of a surface light source device for illustrating effects (emission characteristics) of a light flux control member employed in a second embodiment.

FIG. 13 illustrates surface light source device 10 in accordance with the second embodiment. It is noted that the same components as those employed in the first embodiment are referenced by the same symbols and repeated description is omitted. As shown in FIG. 13, recesses 30 and curved surfaces 31 following the same are formed on front face 24 of light flux control member 3.

Figure 15:
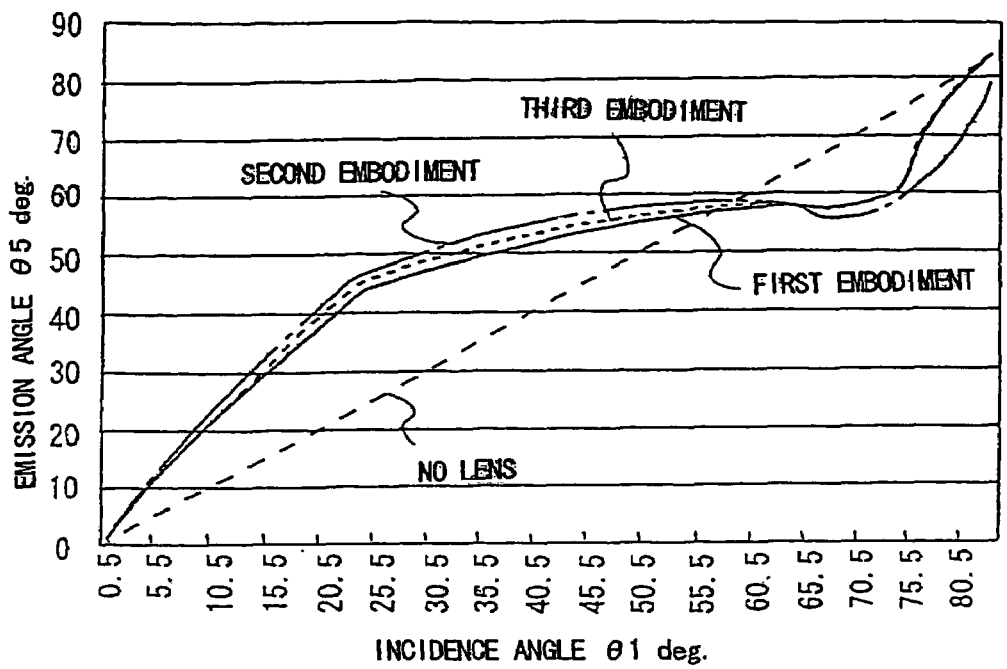
FIG. 15 is a diagram for illustrating relations between light incidence angle θ1 and emission angle θ5 of the light flux control members employed in the first, second, third embodiments and a prior art (no lens), respectively, in contrast with each other.

Recesses 30 and curved surfaces 31 following the same have configurations like those obtained by turning over light flux control member 3 employed in the first embodiment. As a result, light flux control member 3 employed in this embodiment gives $\theta1$-$\theta5$ curve which has generally the same shape as that of $\theta1$-$\theta5$ curve of light flux control member 3 employed in the first embodiment, as shown in FIG. 15. Therefore generally the same emission characteristics are provided as compared with the first embodiment.

Figure 16:
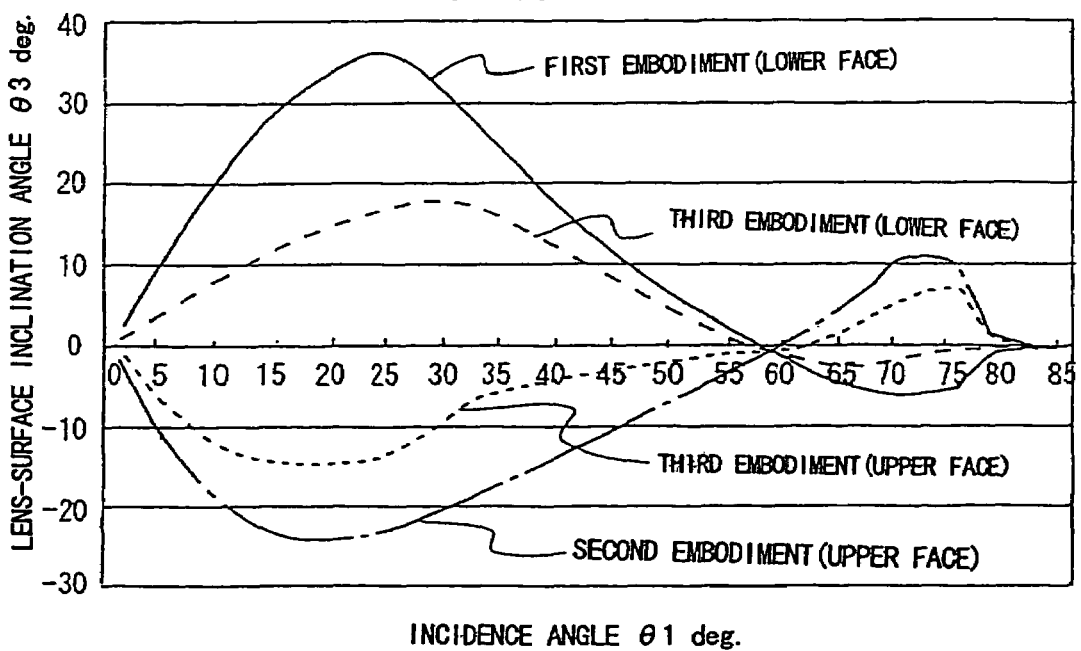
FIG. 16 is a diagram for illustrating relations between light incidence angle θ1 and lens surface inclination angle θ3 of the light flux control members employed in the first, second, third embodiments and a prior art (no lens), respectively, in contrast with each other; and, FIG. 17 is a cross section view of a conventional surface light source device.
Figure 17:
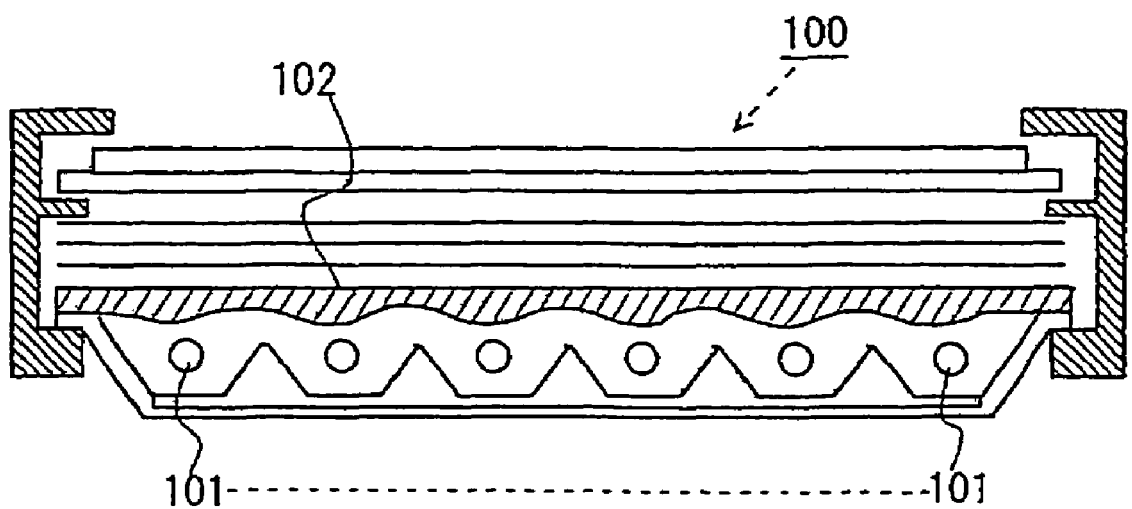

In addition, light flux control member 3 employed in this embodiment gives $\theta1$-$\theta3$ curve having a shape like one obtained by turning over $\theta1$-$\theta3$ curve of light flux control member 3 employed in the first embodiment upside down with respect to abscissas axis of $\theta=0$ and reducing the maximum of $\theta3$, as shown in FIG. 16.

This embodiment provides effects and advantages generally the same as compared with the first embodiment. It is noted that angle $\theta1$ is an angle made by a ray emitted from a fluorescent lamp with respect to normal 32 and $\theta3$ is an angle made by a tangent line at each point of a recess or curved surface with respect to emission reference plane 26. In addition, $\theta5$ is an angle made by an emission ray from light flux control member 3 with respect to a normal of emission reference plane 26.

Figure 14:
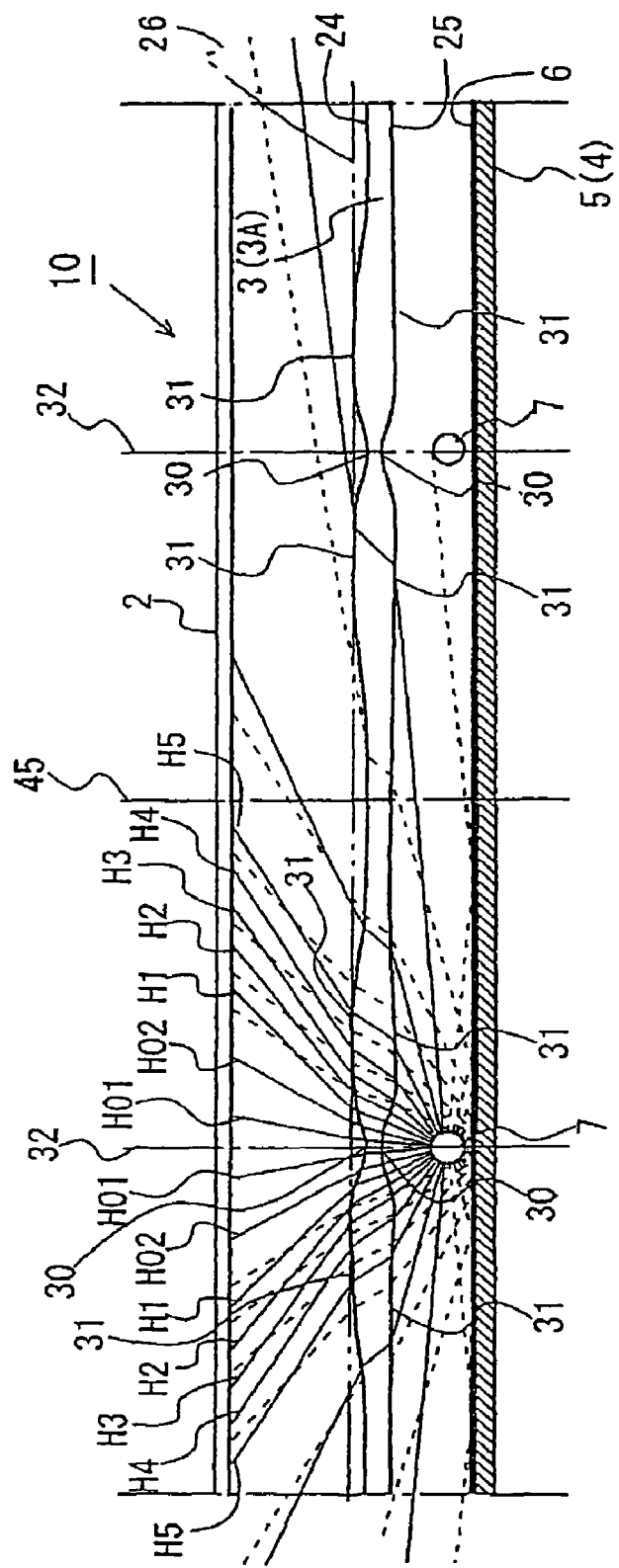
FIG. 14 is a cross section view of a surface light source device for illustrating effects (emission characteristics) of a light flux control member employed in a fourth embodiment.

FIG. 14 illustrates surface light source device 10 in accordance with the third embodiment. It is noted that the same components as those employed in the first embodiment are referenced by the same symbols and repeated description is omitted. As shown in FIG. 14, recesses 30 and curved surfaces 31 following the same are formed on front face 24 and back face 25 of light flux control member 3.

Recesses 30 and curved surfaces 31 have configurations like those obtained by forming recesses 30 and curved surfaces 31 employed in the first embodiment on both the front and back faces of light flux control member 3.

As a result, light flux control member 3 employed in this embodiment gives $\theta1$-$\theta5$ curve which has generally the same shape as that of $\theta1$-$\theta5$ curve of light flux control member 3 employed in the first embodiment, as shown in FIG. 15, and generally the same emission characteristics are provided correspondingly as the case of employing light flux control member 3 in accordance with the first embodiment.

In addition, light flux control member 3 employed in this embodiment gives $\theta1$-$\theta3$ curve (curve of LOWER FACE in THIRD EMBODIMENT) as shown in FIG. 16 on the lower face (back face 25), which has a shape like one obtained by reducing the maximum of absolute value of $\theta3$ so that $\theta3$ gets closer to 0.

Further, on an upper face (front face 24), there provided is a curve as shown by $\theta1$-$\theta3$ curve (curve of UPPER FACE in THIRD EMBODIMENT) shown in FIG. 16, which has a shape like one obtained by modifying $\theta1$-$\theta3$ curve of light flux control member 3 employed in the second embodiment so that the maximum of $\theta3$ is reduced.

This embodiment employing such construction provides effects and advantages generally the same as compared with surface light source device 10 of the first embodiment.

In addition, since light flux control member 3 in this embodiment has the front and back faces to both of which generally the same configuration is given, warping which might be caused by, for instance, thermal shrinkage during molding can be avoided, with the result that light flux control member 3 can be molded at higher accuracy as compared with light flux control member 3 of the first or second embodiment.

The first embodiment allows to be modified as follows.

In the first embodiment, exemplarily described an arrangement in which reflection sheet 6 is disposed on bottom of frame 4 (See FIG. 4). Alternatively, reflective paint may be applied to an inner surface at bottom of frame 4 or frame 4 may be formed of a material having a high light reflectivity. In such cases, numbers of components and cost of product (surface light source device) can be reduced.

In the first embodiment, recess 30 and curved surface 31 are formed symmetrically with respect to normal 32 (See FIG. 6). However, this puts no limitation on the present invention. For example, recesses 30 and curved surfaces 31 located at end portions near to side walls 14 and 15 may be formed asymmetrically to realize a more uniform illumination balance for diffusion member 2. This can cause values of left and right ends of brightness curve shown in FIG. 10 to be increased, with the result that more even emission from diffusion member 2 can be obtained.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An illumination device comprising:
    a reflection member;
    a light flux control member disposed along and separated from said reflection member; and
    a plurality of linear primary light sources disposed between said reflection member and said light flux control member parallel with each other at intervals,
    said light flux control member comprising:
        a back face directed to said reflection member in order to receive light from said primary light sources, and
        an emission face directed oppositely to said back face in order to cause said light received to be transmitted, deflected and emitted, and
        at least one of said back face and said emission face is provided with a plurality of curved recesses and curved surfaces,
            each of said curved recesses having a location corresponding to one of said primary light sources and extending in a longitudinal direction of said one of said primary light source, and
            said curved surfaces being located adjacent to said curved recesses and configured so as to cause said light flux control member to decrease in thickness away from said curved recesses, respectively, and
            each of said primary light sources being disposed so as to supply light including both first rays refracted at a corresponding curved recess and second rays refracted at corresponding curved surfaces adjacent thereto either on entering into said light flux control member or on being emitted from said emission face, and
    said second rays being more inclined with respect to a frontal direction as compared with said first rays.

2. An illumination unit comprising:
    an illumination device as claimed in claim 1; and
    a member positioned so as to be irradiated by an illumination light outputted from said illumination device.

3. The illumination device according to claim 1, further comprising a slope of the curved recesses decreasing away from a center of the curved recesses.

4. A surface light source device comprising:
    a reflection member;
    a light flux control member disposed along and separated from said reflection member;
    a plurality of linear primary light sources disposed between said reflection member and said light flux control member parallel with each other at intervals; and
    a light diffusion member,
    wherein said light flux control member has a back face directed to said reflection member in order to receive light from said primary light sources and an emission face directed oppositely to said back face in order to cause said light received to be transmitted, deflected and emitted; and
    at least one of said back face and said emission face is provided with a plurality of curved recesses and curved surfaces; and
    said light diffusion member is disposed along said emission face in order to diffuse light emitted from said emission face,
        each of said curved recesses having a location corresponding to one of said primary light sources and extending in a longitudinal direction of said one of said primary light source,
        said curved surfaces being located adjacent to said curved recesses and configured as to cause said light flux control member to decrease in thickness away from said curved recesses, respectively, and
        each of said primary light sources being disposed so as to supply light including both first rays refracted at a corresponding curved recess and second rays refracted at corresponding curved surfaces adjacent thereto either on entering into said light flux control member or on being emitted from said emission face, and
    said second rays being more inclined with respect to a frontal direction as compared with said first rays.

5. An illumination unit comprising:
    a surface light source device as claimed in claim 4; and
    a member positioned so as to be irradiated by an illumination light outputted from said illumination device.

* * * * *